United States Patent [19]
Yamamoto

[11] Patent Number: 5,062,504
[45] Date of Patent: Nov. 5, 1991

[54] DRUM BRAKE ASSEMBLY HAVING PARKING BRAKE ACTUATOR ADJUSTER WITH AUTOMATIC BRAKE ADJUSTMENT DURING THE SERVICE BRAKING MODE OF OPERATION

[75] Inventor: Mayjue A. Yamamoto, Yellow Spring, Ohio

[73] Assignee: General Motors Corporation, Detroit, Mich.

[21] Appl. No.: 651,057

[22] Filed: Feb. 4, 1991

Related U.S. Application Data

[63] Continuation of Ser. No. 351,974, May 5, 1989, abandoned.

[51] Int. Cl.[5] .................. F16D 51/46; F16D 65/24
[52] U.S. Cl. .................. 188/79.56; 188/106 F
[58] Field of Search .................. 188/20, 79.56, 79.57, 188/106 A, 106 F, 106 P, 196 BA, 328; 192/111 A

[56] References Cited

U.S. PATENT DOCUMENTS

| | | | |
|---|---|---|---|
| 3,255,849 | 6/1966 | Swift | 188/106 A |
| 4,039,055 | 8/1977 | Meyer et al. | 188/79.56 |
| 4,456,103 | 6/1984 | Muscat | 188/106 A X |
| 4,706,783 | 11/1987 | Rath et al. | 188/79.56 X |
| 4,809,826 | 3/1989 | Charbonnier | 188/79.56 X |

FOREIGN PATENT DOCUMENTS 2419432 11/1979 France .................. 188/79.56

*Primary Examiner*—Robert J. Oberleitner
*Assistant Examiner*—Alfred Muratori
*Attorney, Agent, or Firm*—Ernest E. Helms

[57] ABSTRACT

A drum brake assembly having an automatic adjuster which adjusts the brake shoes for wear as needed during the service braking mode of operation. A spreader bar positioned between the brake shoes is capable of being acted upon by a parking brake actuating lever pivotally mounted on one of the brake shoes to transmit brake actuating forces through the spreader bar to one brake shoe and through the parking brake actuating lever to the other brake shoe to operate the brake assembly during the parking brake mode of operation. One end of the spreader bar is connected to the parking brake actuating lever to transmit tension force thereto during service braking apply, the other end of the spreader bar being connected to the other brake shoe so that service brake applying movement of that other brake shoe pulls the parking brake actuating lever to pivot it in the parking brake apply direction of lever movement. When the automatic adjuster adjusts the brake shoes for brake lining wear so that they are maintained close to the break drum in their fully released positions, the brake shoes are retracted somewhat less than they were before such adjustment. By moving the parking brake actuating lever as noted, it also is adjusted by not returning pivotally quite as far to the release position as before. Thus service brake automatic adjustment is effective through action of the spreader bar for the parking brake mode as well as the service braking mode of brake operation.

1 Claim, 1 Drawing Sheet

DRUM BRAKE ASSEMBLY HAVING PARKING BRAKE ACTUATOR ADJUSTER WITH AUTOMATIC BRAKE ADJUSTMENT DURING THE SERVICE BRAKING MODE OF OPERATION

This is a continuation of application Ser. No. 351,974, filed on May 5, 1989, now abandoned.

BACKGROUND OF THE INVENTION

Typical drum brake assemblies which have automatic brake adjusters operated during the service braking mode of actuation, whether the adjustment takes place during the actuation phase or the release phase, do not adjust the parking brake apply mechanism. This requires the parking brake actuating lever in the brake assembly to be pivoted a greater angular distance as the brake linings are worn in order to move the brake shoes to their points of engagement with the drum for braking to actually begin. This may be take care of if the vehicle owner/operator regularly has the parking brake linkage manually adjusted. Such adjustment usually involves shortening the effective length of the parking brake cable at some point between the parking brake pedal and the vehicle brake assemblies that are used for parking. If such adjustments are not made as the brake linings wear, the parking brake will become less and less effective because the full parking brake actuating force that is available with properly adjusted parking brake mechanism cannot be attained before run out of the available stroke or movement of the parking brake apply mechanism.

FIELD OF THE INVENTION

The invention relates to a drum brake assembly having an automatic brake adjuster which operates during the service braking mode of operation, and particularly includes an arrangement whereby the parking brake actuating lever in the drum brake assembly is also kept at an adjusted position when the brake is in its released condition, that adjusted position being attained in conjunction with service braking operation and the automatic brake adjustment which occurs during such operation.

SUMMARY OF THE INVENTION

A spreader bar positioned between the brake shoes is capable of being acted upon by a parking brake actuating lever pivotally mounted on one of the brake shoes to transmit brake actuating forces through the spreader bar to one brake shoe and through the parking brake actuating lever to the other brake shoe to operate the brake assembly during the parking brake mode of operation. One end of the spreader bar is connected to the parking brake actuating lever to transmit tension force thereto during the service braking apply phase, the other end of the spreader bar being connected to the other brake shoe so that service brake applying movement of that other brake shoe pulls the parking brake actuating lever by exerting tension force through the spreader bar to pivot the parking brake actuating lever in the parking brake apply direction of lever movement. When the automatic adjuster adjusts the brake shoes for brake lining wear so that they are maintained close to the brake drum in their fully released positions, the brake shoes are retracted somewhat less than they were before such adjustment. By moving the parking brake actuating lever as noted, it also is adjusted by not returning pivotally quite as far to the release position as before. Thus service brake automatic adjustment is effective through action of the spreader bar for the parking brake mode as well as the service braking mode. The spreader bar has arrangements for keeping it in position on both brake shoes and the parking brake actuating lever after it is assembled in place. It can also be removed for removal and replacement of various components of the brake assembly for maintenance.

DESCRIPTION OF THE PREFERRED EMBODIMENT

Figure 1:
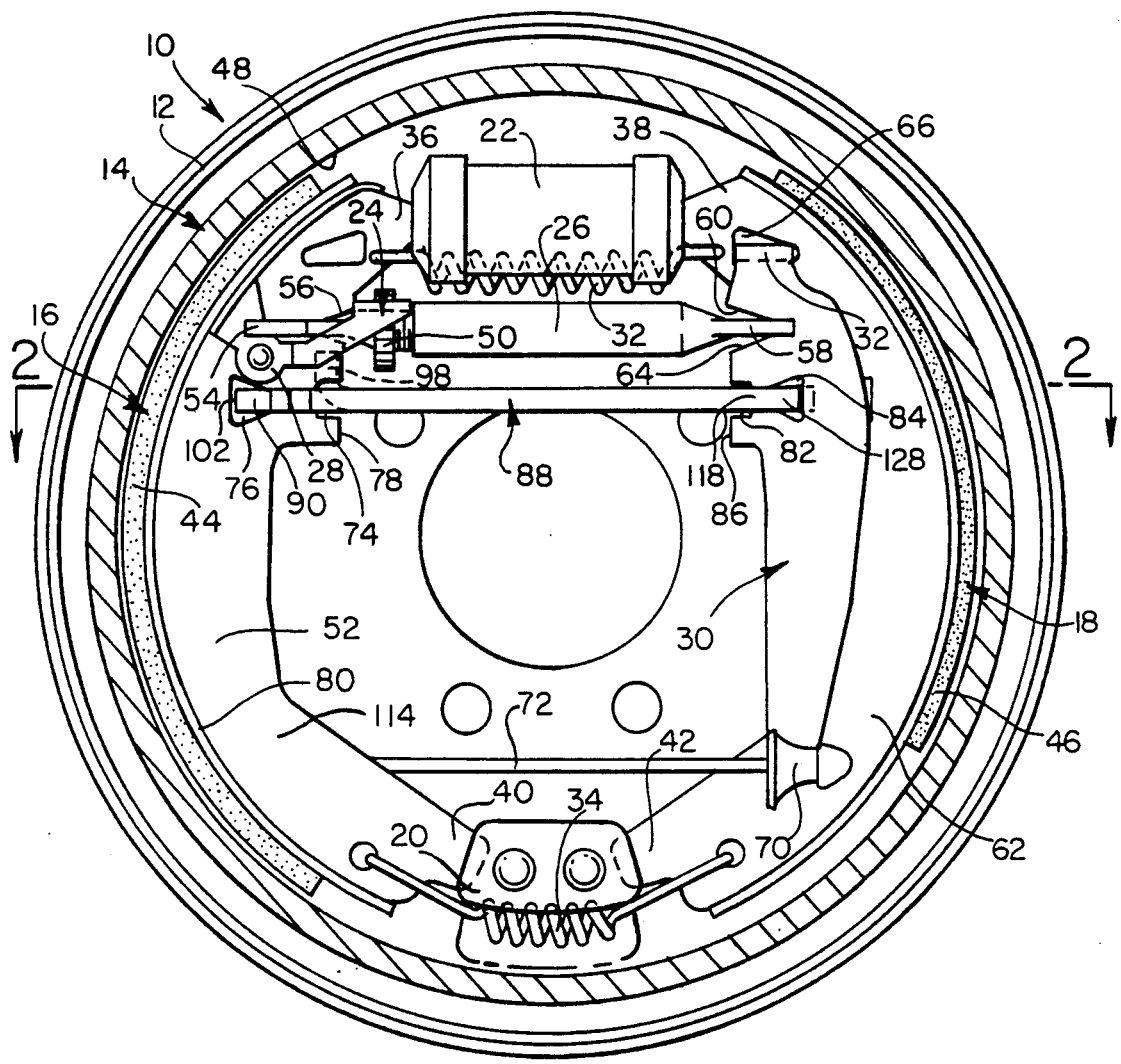
FIG. 1 is an elevation view of a drum brake assembly embodying the invention with parts shown in section. The assembly is shown in the brake released position. Parts of the assembly which are well known in the art are omitted or shown in simplified form.

The drum brake assembly 10 of the drawing is illustrated as being of the leading-trailing type. It is to be understood, however, that the invention is not limited to use with that type, but may be used in other types of drum brakes such as duo servo brakes. Assembly 10 includes a backing plate 12; a drum 14 which is rotatably mounted to be braked; a pair of brake shoe assemblies 16 and 18 which are mounted within the brake assembly envelope defined by the backing plate 12 and the drum 14; a shoe anchor 20 secured to the backing plate 12 and shown at the lower part of the assembly 10 as that assembly is oriented in the drawing; a wheel cylinder 22 shown at the upper part of the assembly 10 and also mounted on the backing plate 12; an automatic brake adjuster mechanism 24, shown in simplified form as including an adjuster strut 26 and a known pawl arrangement 28 which cooperates with the strut 26 to increase the effective length of the strut during service braking as the brake linings of the shoe assemblies are worn; a parking brake actuating lever 30 pivotally mounted on shoe assembly 18; a parking brake cable connected to pivotally move lever 30 on shoe assembly 18; and tension springs 32 and 34 connected with the shoe assemblies 16 and 18 to continually urge them toward engagement with the anchor 20 and the wheel cylinder 22.

In this typical drum brake assembly arrangement, the wheel cylinder is hydraulic pressure actuated to move the adjacent upper ends 36 and 38 of shoe assemblies 16 and 18 apart while the adjacent lower ends 40 and 42 of shoe assemblies 16 and 18 remain in engagement with anchor 20. This actuation causes the shoes assemblies to pivot, shoe assembly 16 pivoting counterclockwise about its lower end 40 and shoe assembly 18 pivoting clockwise about its lower end 42. The brake linings 44 and 46 of shoe assemblies 16 and 18 engage the friction braking surface 48 of drum 14, and braking action is obtained. When the hydraulic pressure in wheel cylinder 22 is released, spring 32 pulls the shoe ends 36 and 38 back to the position shown in FIG. 1.

In this released position the linings 44 and 46 are slightly spaced from the drum surface 48. Each time the brake assembly is actuated, this space must be taken up by movements of the shoe assemblies before braking action can actually begin. Without adjustment of the shoes as the linings wear, this space will increase, requiring more stroke of the wheel cylinder and the mechanism operating it to initiate braking action.

Brake adjusters have been used for many years which will adjust the retracted position of the shoe assemblies so that the linings 44 and 46 remain closely adjacent to but still spaced from the drum surface 48 as the linings wear with use. It is also common to provide an automatic brake adjuster mechanism to accomplish these adjustments are needed. The adjuster mechanism 24 is one such arrangement. Automatic adjusters usually act during some phase of the service braking operation after sensing sufficient actuating movement of one or both brake shoe assemblies before the linings engage the drum to indicate that enough brake lining wear has occurred to require adjustment.

In the type of mechanism 24 shown, strut 26 includes a bolt-and-nut threaded arrangement with end caps. The bolt part is rotated relative to the nut part to increase the effective length of the strut by screw threading action. A star wheel 50 is a part of the bolt part, and it is rotatably driven slightly as needed to obtain the desired lengthening of strut 26. This is done by pivotal movements of the suitable pawl arrangement 28, which is moved on the shoe web 52 of shoe assembly 16 during the shoe actuating movement phase of service braking. Pawl arrangement 28 has a pawl which normally engages a tooth of the star wheel 50. If the pawl pivots far enough, it engages the next tooth of the star wheel. When the brake release phase occurs, the pawl arrangement 28 is pivoted so that its pawl rotates the star wheel 50 slightly, threading the bolt part slightly further out of the nut part of strut 26 and effectively increasing the length of the strut. Since the end cap forming strut end 54 is bifurcated and fits within a notch 56 formed in shoe web 52, and the end cap forming strut end 58 is likewise bifurcated and fits within a notch 60 formed in shoe web 62 of shoe assembly 18, the increased length of the strut 26 prevents the shoe assemblies 16 and 18 from returning to the same released position as before the adjustment occurred. Instead, they do not move back quite as far, and the space between the linings is less than would have been the case if they had moved back to the pre-adjustment position.

Parking brake actuating lever 30 also has a notch 64 formed in it in which the bifurcated strut end 58 also fits. Lever 30 has its upper end 32 bent so as to extend into the aperture 66 formed in shoe web 62 near shoe end 38. This provides the pivot for lever 30 as well as the structure by which lever 30 exerts brake apply force on shoe assembly 18 during parking brake operation.

The lower end 70 of lever 30 is connected to a parking brake cable 72 which can be tensioned to pivot lever 30 clockwise, as seen in the drawing, for parking brake operation. As is well known in the art, cable 72 is also provided with means for returning the cable and lever 30 to the released position when the parking brake actuating tension force in the cable is released. This lever position is further counterclockwise, as shown, than that which would maintain the lever in engagement with strut 26, opening a force-transmittable space between that strut and the lever which must then be taken up the next time that the lever is pivoted clockwise for parking brake operation before the strut 26 can be moved to move shoe assembly 16 toward drum engagement and by reaction through lever end 32 to move shoe assembly 18 for the same purpose. It is this unnecessarily large space that occurs as the strut 26 is adjusted while lever 30 is not adjusted that is overcome by the structure embodying the invention.

Shoe web 52 is provided with a notch 74 and an aperture 76, the notch being formed in the web edge 78 and the aperture being spaced from edge 78 toward the shoe rim 80 of shoe assembly 16. It is common production practice to make shoe webs of both shoe assemblies alike to reduce the numbers of different parts. While shoe web 62 could have a notch and aperture of the same type, they would form no function in this arrangement; for simplicity web 62 of shoe assembly 18 is not so shown.

However, parking brake actuating lever 30 is provided with a similar notch 82 and aperture 84, with the notch 82 being in the edge 86 of the lever that faces shoe assembly web 52 and the aperture 84 being in a central part of the lever body.

Figure 2:
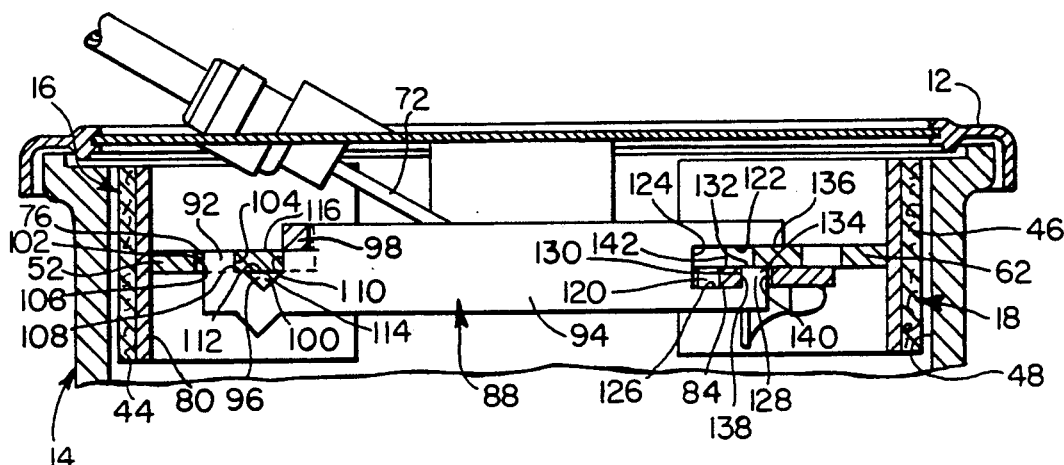
FIG. 2 is a cross section view of the drum brake assembly of FIG. 1, taken in the direction of arrows 2—2 of that FIGURE and having parts broken away.

When the brake assembly is assembled as shown, notches and apertures 74,82 and 76,84 are substantially in longitudinal alignment and accommodate the spreader bar 88 to be further described. It is recognized that, since lever 30 lies adjacent shoe web 62 and generally in planar surface contact with it, and shoe webs 52 and 62 are usually in direct planar alignment, web 52 and lever 30 are slightly offset as shown in FIG. 2. This offset is encompassed in the statement that their notches and apertures (and by clear inference web 52 and lever 30) are substantially in longitudinal alignment.

Spreader bar 88 is illustrated as being stamped from flat plate stock. It has one end 90 formed with a tab 92 in the plane of its main body 94, a recess 96 spaced longitudinally inward from tab 92, and a tab 98 next to recess 96 and struck upwardly. Recess 96 has a relief portion 100 provided for assembly purposes. When bar 88 is assembled in the brake assembly, tab 92 extends into web aperture 76 with the tab outer edge surface 102 and inner edge surface 104 respectively being in at least incipient force transmitting engagement with the outer and inner edge surfaces 106 and 108 of aperture 76 adjacent to those tab edge surfaces.

The inner edge surface 110 of recess 96 is within the notch 74 of shoe web 52 and is in similar engagement with the inner end 112 of notch 74. Tab 98 is located where recess inner edge surface 110 ends, so that it is located on the opposite side 114 of shoe web 52 from web side 116 where the major part of bar end 90 is located. Tab 98 is in surface engagement with web side 114 so that it, in cooperation with the portion of bar end 90 between tab edge surface 104 and recess edge surface 110, prevents the bar end 90 from lateral movement which would be sufficient to remove tab 92 from aperture 76.

Spreader bar 88 has its other end 118 formed with a longitudinally extending recess 120 defined by one side 122, inner end 124, another side 126 facing side 122, and edges of a tab 128. Tab 128 has an inner edge surface 130 facing recess inner end 124, an end surface 132 facing recess side 122 but spaced therefrom a distance that is as large as or slightly larger than the thickness of show web 62, and an outer edge surface 134.

When spreader bar end 118 is assembled in place in the brake assembly, shoe web 62 extends into recess 120 alongside recess side 122 toward recess inner end 124, with web side 136 in slidable surface engagement with recess side 122. Tab 132 extends in aperture 84 of parking brake actuating lever 30 so that the portion of lever 30 between its aperture 84 and its notch 82 is within recess 120. Aperture 84 has its one edge surface 138 engaging tab inner edge surface 130 and its other edge surface 140 engaging tab outer edge surface 134 in force transmittable relation. It can be appreciated that a tension force exerted longitudinally through bar 88 will be exerted through tab surface 130 to aperture surface 138 to urge lever 30 pivotally clockwise as seen in FIG. 1. Similarly, a compressive force exerted longitudinally through bar 88 will be exerted through tab surface 134 to aperture edge surface 140 to urge lever 30 pivotally counterclockwise as seen in FIG. 1. In both instances, bar 88 and lever 30 will slide along shoe web 62.

It should be noted that, as shown in FIG. 1, apertures 76 and 84 are wider at their opposite ends than at their more adjacent ends to allow some slight vertical pivotal movements of the ends of spreader bar 88 as the brake shoes, the lever 30 and the spreader bar are moved during various brake operations.

When the service braking mode of operation is begun, shoe upper ends 36 and 38 move outwardly from each other. Movement of shoe assembly 16 moves spreader bar 88 leftwardly as seen in FIG. 1, pulling parking brake actuator lever 30 pivotally with it. The separation between the inner end 124 of recess 120 and the edge 142 of shoe web 62 increases with this movement of bar 88 and the movement of shoe assembly 18, but shoe web 62 remains partially within recess 120.

When the release phase of the service braking mode of operation takes place, the shoe assemblies 16 and 18 are retracted by spring 32, and shoe web 52 exerts a compressive force longitudinally on spreader bar 88. This force is transmitted through tab outer surface 134 to aperture surface 140, and moves the lever 30 pivotally counterclockwise on shoe web 62. If no brake adjustment occurred during this service braking operation, shoe assemblies 16 and 18 and lever 30 would be returned to the same brake released position that they occupied before this service braking operation.

However, if the automatic brake adjuster mechanism was actuated during this service braking operation, shoe assemblies 16 and 18 are retracted only to the extent that the now expanded adjuster strut 26 permits. They therefore are not retracted as far from the brake drum as they would have been had no adjustment occurred. Since shoe assembly 16 does not move as far in a clockwise pivotal direction about its lower end 40 as before, it does not move spreader bar 88 as far rightwardly, as seen in FIG. 1, as before as a result the spreader bar 88 is positionally translated towards the shoe assembly 16. Therefore lever 30 is not pivoted as far counterclockwise on shoe web 62 as before. Also, since neither is shoe assembly 18 moved pivotally counterclockwise as far as before, the pivot end 32 of lever 30 is slightly rightward of the released position it occupied before the service braking operation during which adjustment occurred. The return action of cable 72 cannot move lever 30 further counterclockwise because of the positive force-transmittal interconnections (pull) of the spreader bar, shoe assemblies and adjuster strut. Therefore, the parking brake actuating lever is returned to a brake adjusted position in response to service braking operation and adjustment, and has less pivotal travel to take up during the next parking brake apply mode of operation than it would have had the structure embodying the invention not been installed in the brake assembly.

In the initial phase of the parking brake mode of operation, lever 30 may apply some brake apply force through strut 26 to shoe assembly 16. However, due to the geometry (movement of brake assemblies, length of strut and spreader bars, location of pivotal mounting of actuating lever to brake shoes, location of pivotal mounting of strut and spreader bar to brake shoes and lever) of the particular brake assembly disclosed, the shoe upper ends will quickly be so spread apart and lever will be so pivoted clockwise on shoe assembly 18 that spreader bar 88 will be the medium through which parking brake apply forces are applied to shoe assembly rather than strut 26. In other types of brake assemblies, such as a duo servo brake, the geometry of the movements of the shoe assemblies, the strut, the parking brake actuating lever and the spreader bar may be such that the strut 26 continues to carry at least some of the brake apply forces to shoe assembly 16 during parking brake actuation.

The embodiments of the invention in which an exclusive property or privilege is claimed are defined as follows:

1. In a drum brake assembly having a rotatable drum to be braked; first and second brake shoe assemblies adapted to be moved into friction braking engagement with the drum in a service brake operating mode and in a parking brake operating mode said first brake shoe assembly having a web portion with an aperture; first actuating means for moving said shoe assemblies in the service brake operating mode; second actuating means for moving said shoe assemblies in the parking brake operating mode and including a parking brake actuating lever having one end pivotally mounted on said second brake shoe assembly, a parking brake cable attached to the other end of the parking brake actuating lever and adapted to pivotally move that lever toward the first brake shoe assembly for parking brake actuation; and an automatic adjuster actuated as needed in the service brake operating mode and including an axially expandable adjuster strut operatively connecting said first and second shoe assemblies and said parking brake actuating lever; the improvement comprising:

a parking brake spreader bar also providing a parking brake actuating lever adjuster, said spreader bar having one end with a tab for a hooked connection with said web aperture of said first shoe assembly and the other end of said spreader bar having a tab for a hooked connection to said parking brake actuating lever and said spreader bar being in force transmitting engagement with said first shoe assembly and said parking brake actuating lever to transmit both tension and compression forces therebetween; said spreader bar during the service brake actuation phase acting, as the brake shoe assemblies are spread apart in the vicinity of said spreader bar by said first actuating means, to move with said first brake shoe assembly and by exerting tension force on said parking brake actuating lever pivotally moving that lever toward the parking brake apply position to take up such lever movement as would be required in the parking brake apply phase to move the brake shoe assemblies substantially to the position to which they are moved by said first actuating means; said spreader bar acting to keep said parking brake actuating lever at an adjusted pivotal position on said second brake shoe assembly attained when the service brake mode automatic adjuster has expanded the adjuster strut to provide a brake shoe assembly brake release position that is a position adjusted for wear of said brake shoe assemblies by said spreader bar positional translation in a direction toward said first brake shoe assembly resultant of said first brake shoe assembly web aperture hooked connection with said spreader bar causing said spreader bar to pull on said parking brake lever; said parking brake actuating lever, thus being positionally adjusted to compensate for brake lining wear.

* * * * *